Patented Mar. 14, 1933

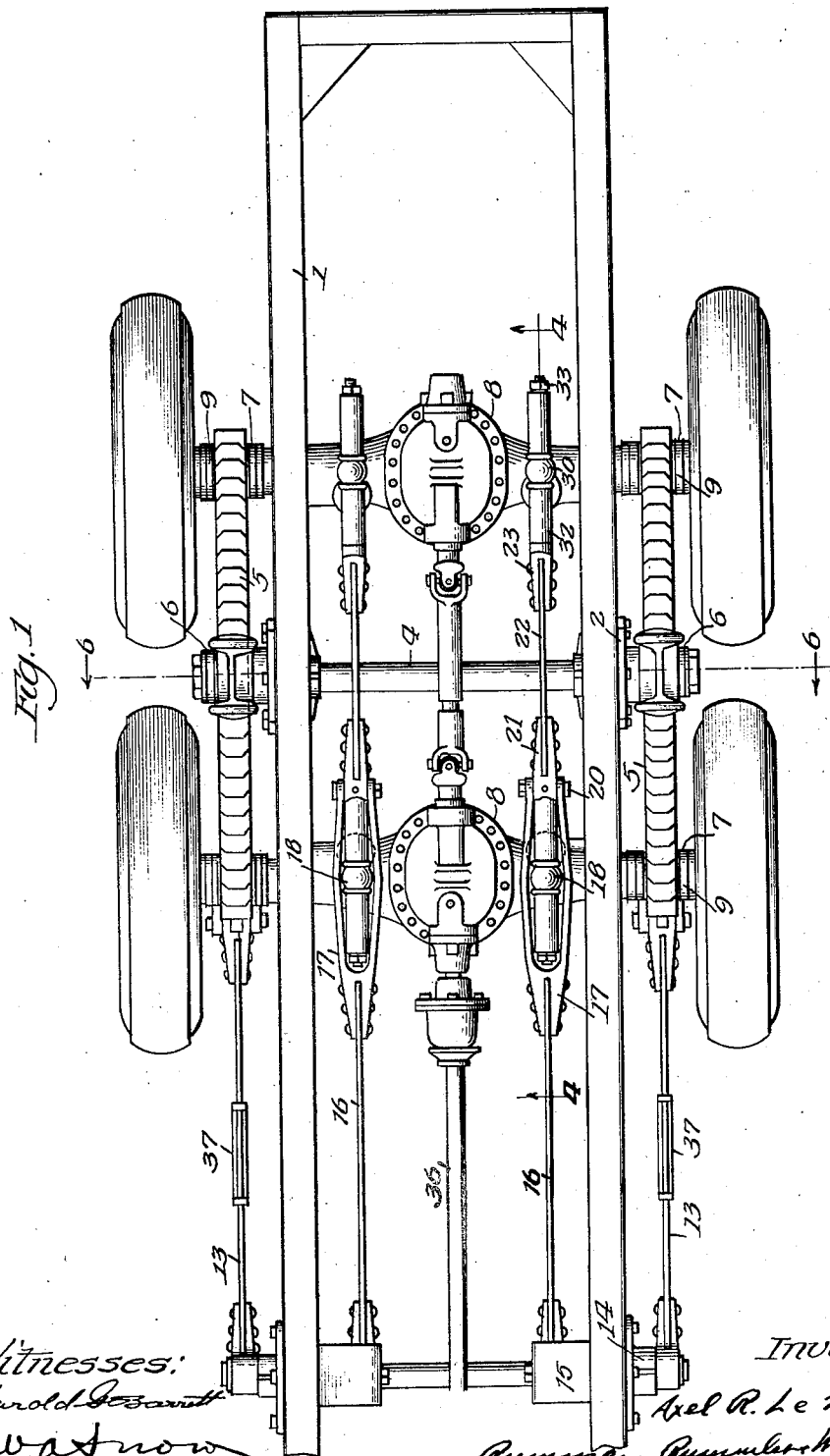

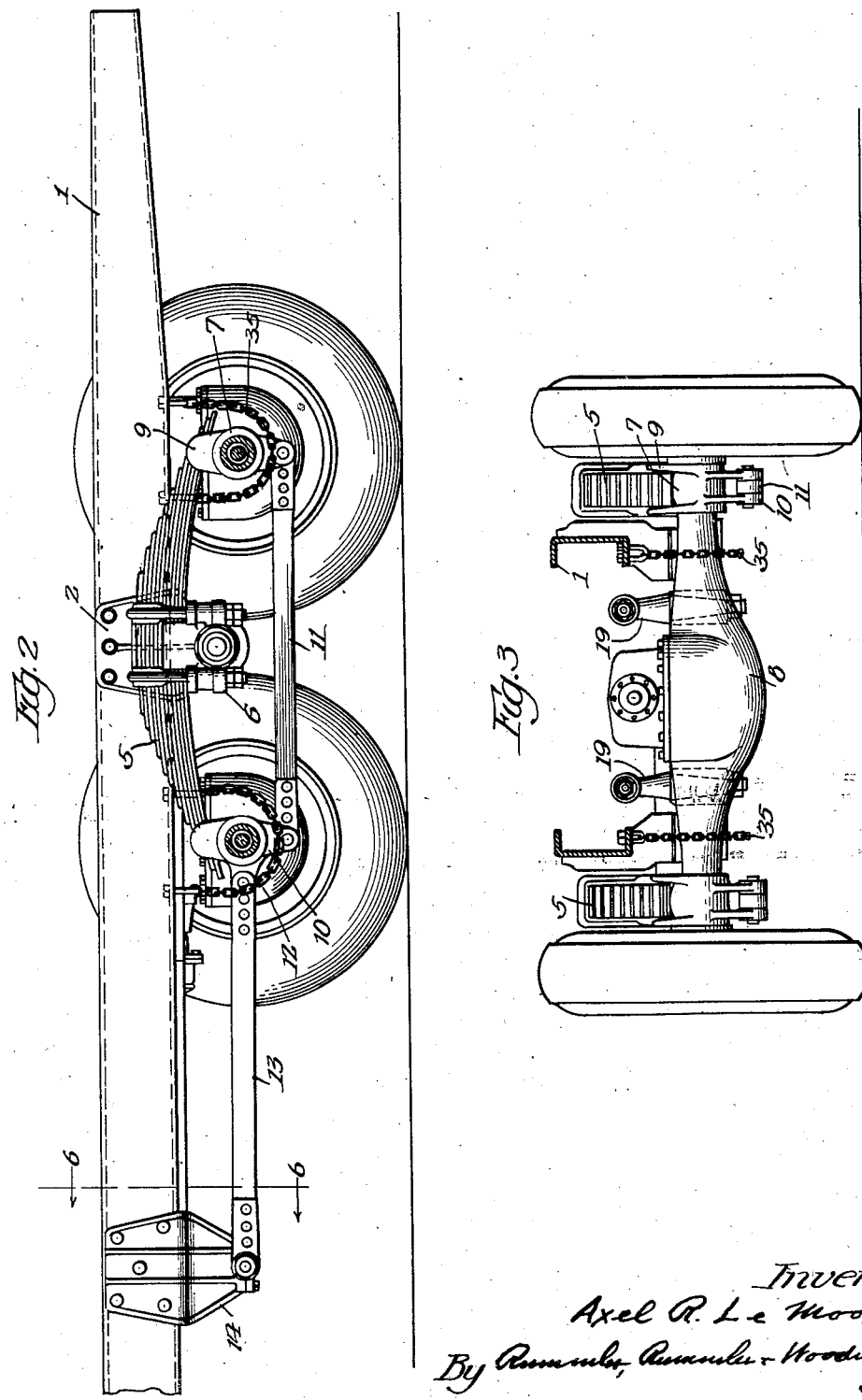

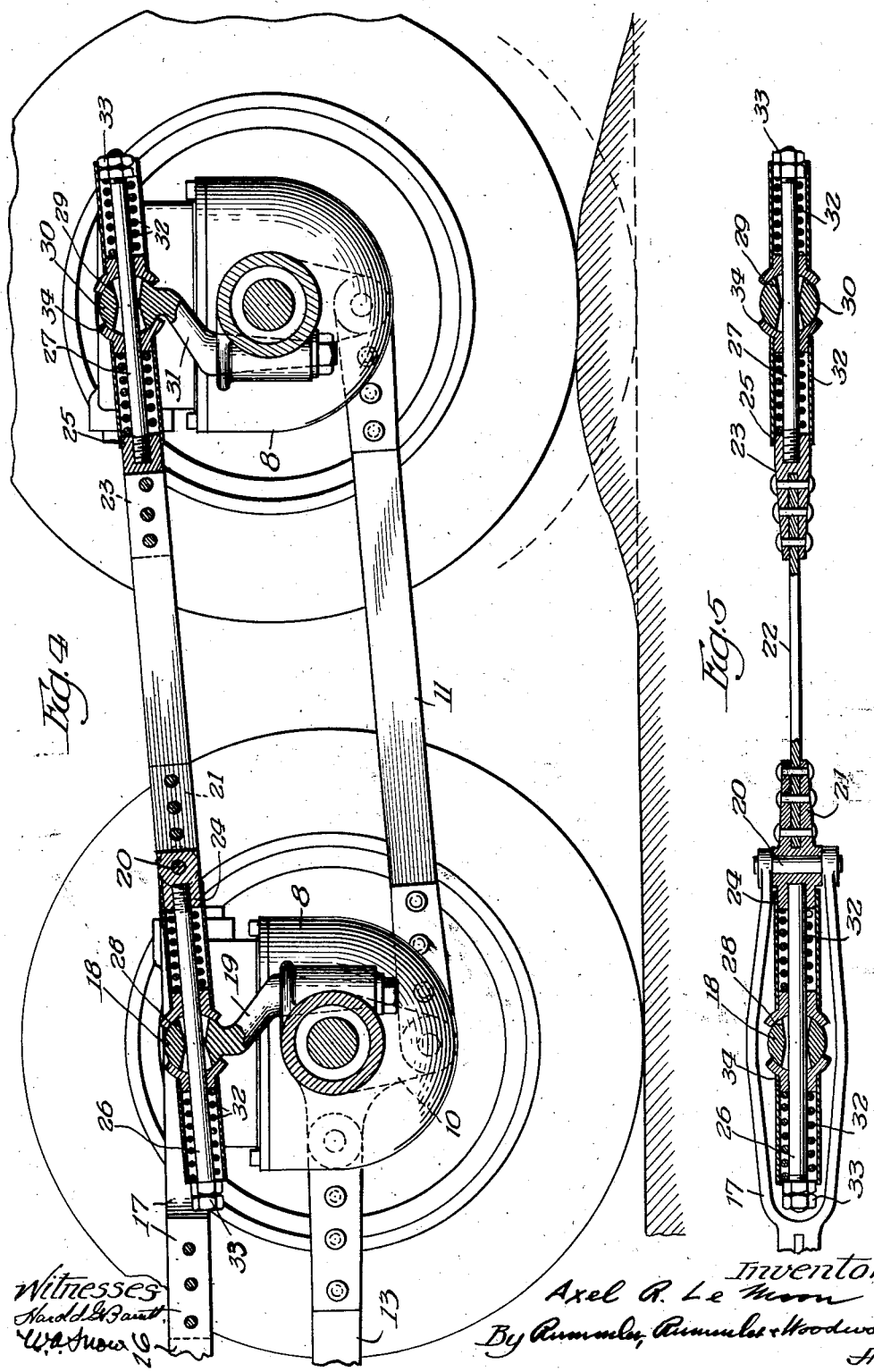

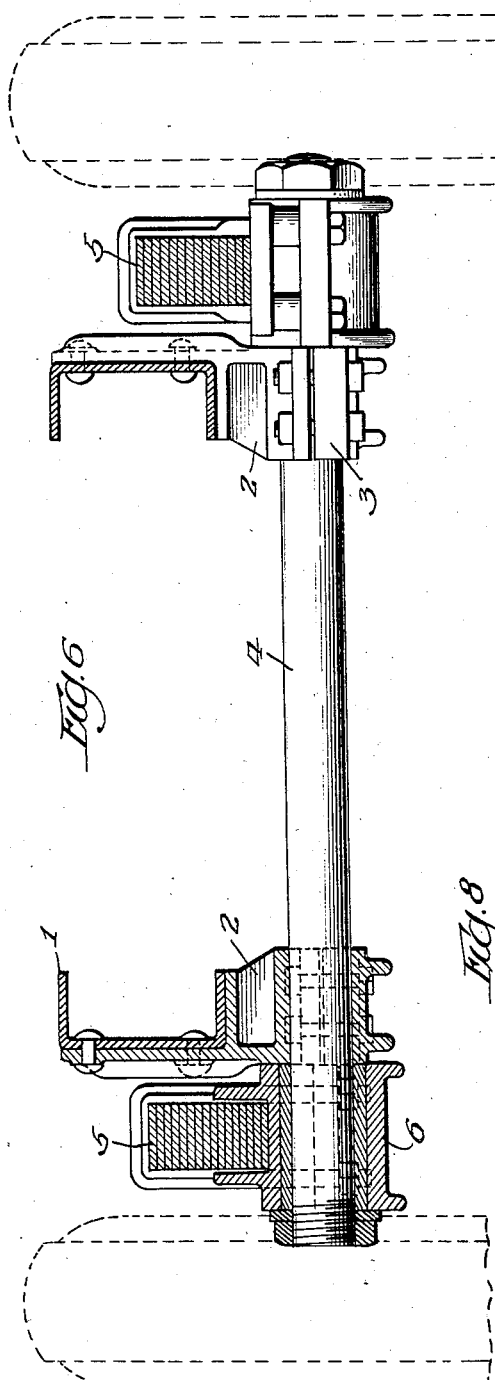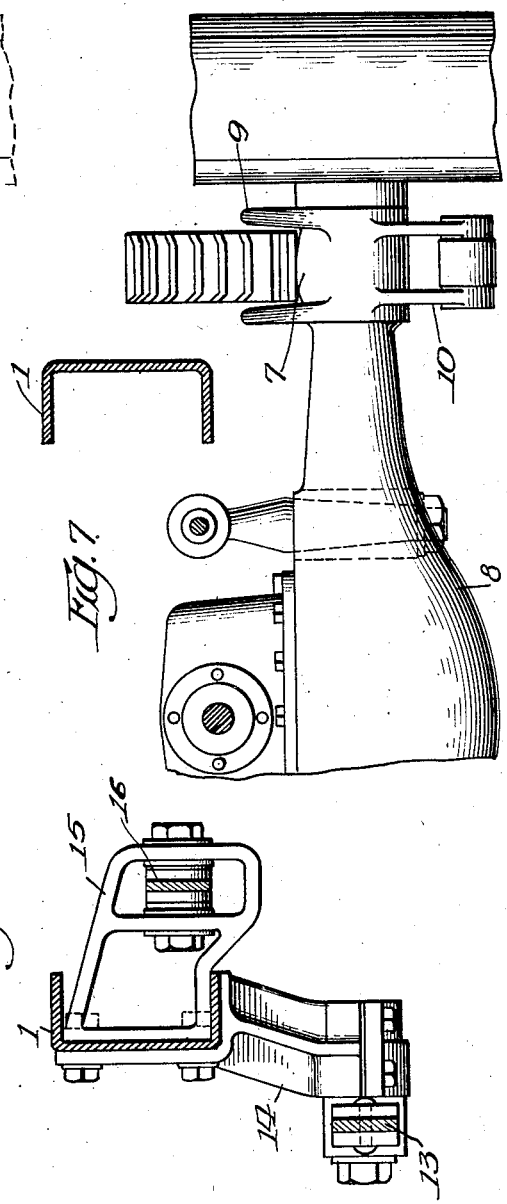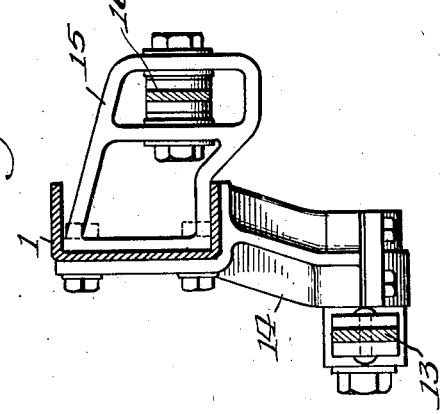

1,901,309

UNITED STATES PATENT OFFICE

AXEL R. LE MOON, OF CHICAGO, ILLINOIS

FOUR-WHEEL VEHICLE DRIVE CONSTRUCTION

Application filed April 7, 1930. Serial No. 442,165.

This invention relates to a vehicle drive mechanism of the type described in applicant's Patent 1,761,135, June 3, 1930, motor truck drive mechanism.

The patent above referred to describes a mounting for the four rear drive wheels of a truck including thrust bars and links in a general parallelogram arrangement between the frame and drive unit and between the axle housings of the drive unit, all designed for particularly heavy loads and rough usage.

The present invention is much along the same lines and its purposes are the same as the ones described in the above mentioned patent, with the additional provision for a limited added flexibility, responsive to undue stresses in the mechanism, to save the axle housing and related mechanism from the effects of reaction under conditions such as occur upon a sudden application of the brakes for stopping or application of power in starting.

The purposes of the invention are accomplished by a construction, as shown in the drawings, in which:

Figure 1 is a plan view of improved drive mechanism including the rear portion of the chassis frame, the front part being broken away.

Fig. 2 is a side view with the rear wheels removed.

Fig. 3 is a rear view.

Fig. 4 is an enlarged sectional view taken on the line 4—4 of Fig. 1 but showing one of the wheels moved upwardly because of an irregular road surface.

Fig. 5 is a fragmentary sectional plan detail of a thrust linkage shown in Fig. 4.

Fig. 6 is an enlarged sectional view taken on the line 6—6 of Fig. 1.

Fig. 7 is a fragmentary view partly in section, illustrating the axle housing.

Fig. 8 is a detail illustrating a bracket attached to the frame for pivotally receiving the ends of thrust or radius bars.

The essential parts of the construction, illustrated and described in detail further on, are a vehicle frame and a drive unit below the frame, comprising a pair of axle housings, between which and the frame are supporting springs pivotally secured to the frame at the middle and having their ends resting upon said housings, and a parallel link construction between the housings and between the housings and the frame. This parallel link arrangement resists relative motion between the axle housings except as permitted by the supporting springs and includes resilient means for allowing a limited degree of flexibility in the drive unit.

Referring to the drawings, the vehicle frame 1 is shown provided with brackets 2 to which are clamped, by the bracket caps 3, a cross tube 4 constituting part of the vehicle frame. The cross tube 4 extends outwardly beyond the frame 1 for the purpose of providing a support for the springs 5. The springs are centrally clamped to the tube 4 by the clamping means 6, shown in Figs. 2 and 6.

The ends of the springs rest upon the convex spring seats 7 of the axle housings 8 between the ears 9 which may be integral with the housings 8. The springs are of less width than the distance between the ears 9, as shown in Fig. 7, in order to provide some freedom of motion between the axle housings and the springs; for example, when the axles are tilted, due to one wheel rising higher than the other, or there is a tendency for the axle housings to shift laterally slightly, with reference to the vehicle frame when the vehicle is turning.

The axle housings are provided with downwardly extending ears 10 between which are pivotally mounted links 11, connecting the two axle housings at points beneath their axes. The more forward axle housing is provided with forwardly extending ears 12 to which are pivotally connected radius bars 13, which at their forward ends are pivotally connected with the brackets 14 depending from the frame.

Above their axes, the axle housings are connected together by the link structure, shown in Figs. 1, 4 and 5. This link structure also extends forwardly to brackets 15, extending inwardly from the side channels of frame 1. This linkage comprises the thrust bar 16 pivotally connected to bracket 15 above and in line with the pivotal connection with the bar 13 and the bracket 14. At their rear ends, the thrust bars 16 terminate in yokes 17 passing around the spherical tops 18 of posts 19 extending upwardly in fixed position from the forward axle housing 8.

The yokes 17 are pivotally connected by short shafts or pins 20 to clevises 21 which are connected by links 22 with clevises 23. The clevises 21 and 23 have internally threaded sockets 24 and 25 for receiving threaded ends of rods 26 and 27. These rods pass through counter-sunk apertures 28 in the spherical heads 18 of posts 19 and similar apertures 29 in the spherical heads 30 of posts 31 extending upwardly from the rear axle housing 8.

Surrounding the rods 26 and 27, at each side of the spherical heads 18 and 29 are compression springs 32.

Nuts 33 are secured to the free ends of the rods 26 and 27 and these rods pass through collars 34 having concave surfaces for bearing against the spherical heads 18 and 30. This upper linkage connects the two axle units together and to the vehicle frame but, due to the sliding connection between the rods 26 and 27 and the heads 18 and 30 and the countersunk apertures in these heads, one axle housing may move upwardly or downwardly with respect to the other and, upon excessive reaction to the driving or braking torques, may otherwise have slight relative motion; but such motion is extremely slight, due to the strength of the springs 32 and resistance to motion of the links 11 and radius bars 13.

The downward movement of the axle housings, or one side thereof, in case wheels drop into a depression in the road, is limited by the chains 35 looped around the underside of each axle housing beneath the side bars of frame 1, to which the chains are secured by U-bolts.

The arrangement of the propeller shafting 36 from the motor clutch to the differentials in the axle housings is one that is now commonly used in four-wheel drive constructions and includes a worm drive, so that the shafting may pass directly from the worm in the front housing to the worm in the rear differential housing.

Some of the links, particularly the radius bars 13, are subject to twisting strains. These bars are centrally reinforced by spring leaves 37 clamped thereto, as shown in Fig. 1.

In the operation of this drive unit, the load is equalized between the four wheels under normal conditions and the axle housings are maintained in alinement, although the structure is not so rigid as to interfere with some slight flexibility of the unit, as required when an axle is tilted or when axle is lifted above the horizontal plane of another; nor is a very slight movement of the axle housings in the direction of their axes prevented when the vehicle is making a turn. The spring mounting is such, as may be seen in Fig. 7, as to allow a slight rolling action of an axle housing on the ends of the springs when the housing is tilted laterally. Likewise, the ears 9 are slightly spaced from the springs, so that the housing may shift slightly along an axial line. When power is suddenly applied to the propeller shafting or the brakes grip hard, the reaction of the torque passes through the axle housings, tending to oscillate the same on their axes. Such oscillation is resisted by the parallel link arrangement but is cushioned also due to the spring arrangement on the upper set of links. Whatever tendency there may be for the housing to rotate is resisted, reacted upon and transmitted from one housing to the other through the linkage and spring arrangement, as may be seen from Fig. 4 and also through the radius bars 13 and thrust bars 16 to the vehicle frame. Lateral tilting of the axle housings places a twisting strain upon the links which are constructed of steel for this purpose and for the same reason may be reinforced, as indicated at 37 of Fig. 1.

Although but one specific embodiment of this invention has been herein shown and described, it will be understood that numerous details of the construction shown may be altered or omitted without departing from the spirit of this invention as defined by the following claims.

I claim:

1. In a vehicle, a frame structure, a pair of driving axle housings, springs centrally secured to the frame and having their ends slidably resting upon the axle housings, parallel link structures connecting said housings above and below the axes of the housings, said link structures including compression spring connections with the axle housings for resisting relative motion between said housings, and thrust bars connecting said link structures with the frame.

2. In a vehicle, a frame structure, a pair of driving axle housings, springs attached to the frame structure between said axle housings and having their ends slidably bearing against the upper side of said housings, parallel link structures connecting said housings above and below the axes of the housings, said link structures including compression springs for resisting relative motion between said housings, means for transmitting thrust from one of said axle housings to the frame structure.

3. In a vehicle, a frame structure, a pair of driving axle housings, springs attached to the frame structure between said axle housings and having their ends slidably bearing against the upper side of said housings, thrust link structures connecting said housings above and below the axes of the housings and connecting the housings with the frame, said link structures including opposed compression springs for resisting relative motion between said housings, and between the housings and the frame structure.

4. In a vehicle, a frame structure, a plurality of driving axle housings horizontally spaced apart beneath said frame and connected together by parallel links arranged above and below said housings and pivoted thereto at their ends, parallel links extending from vertically-spaced pivots on said frame to pivotal connections with said first mentioned links, and opposed compression springs associated with said first mentioned links for resisting thrust between said housing and said frame.

5. A vehicle frame, a pair of axle housings extending laterally beneath said frame, a pair of links having their ends pivoted to said housings beneath the axles of the housings, a pair of links pivoted to said frame structure and one of said axle housings, and linkage extending from the frame structure to pivotal connections with each of said housings and including resilient means for resisting motion between the axle housings and the thrust between said axle housings and the frame.

6. A vehicle frame, a pair of axle housings extending laterally beneath said frame, a pair of links having their ends pivoted to said housings beneath the axles of the housings, a pair of links pivoted to said frame structure and one of said axle housings, linkage extending from one axle housing to the other having pivotal connections with each of said housings and including opposed compression springs for resisting motion between the axle housings, and linkage having yoke connections with said last named linkage and extending to said frame to transmit thrust between said axle housings and the frame.

Signed at Chicago this 4th day of April, 1930.

AXEL R. LE MOON.